(12) United States Patent
Kuo et al.

(10) Patent No.: US 10,502,885 B2
(45) Date of Patent: Dec. 10, 2019

(54) LIGHT SOURCE MODULE

(71) Applicant: Nano Precision Taiwan Limited, Hsinchu County (TW)

(72) Inventors: Hao-Jan Kuo, Hsin-Chu (TW); Chao-Hung Weng, Hsin-Chu (TW); Ming-Ta Ke, Hsin-Chu (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 0 days.

(21) Appl. No.: 15/499,675

(22) Filed: Apr. 27, 2017

(65) Prior Publication Data

US 2018/0106950 A1  Apr. 19, 2018

(30) Foreign Application Priority Data

Oct. 19, 2016 (CN) .................... 2016 2 1135868 U

(51) Int. Cl.
*F21V 8/00* (2006.01)

(52) U.S. Cl.
CPC .......... *G02B 6/0053* (2013.01); *G02B 6/0051* (2013.01)

(58) Field of Classification Search
CPC .. G02B 6/0053; G02B 6/0033; G02B 6/0051; G02B 6/0055
See application file for complete search history.

(56) References Cited

U.S. PATENT DOCUMENTS

| 6,827,458 B2 * | 12/2004 | Suga ................. G02F 1/133615 349/65 |
| 9,285,532 B2 * | 3/2016 | Lee ....................... G02B 6/0053 |
| 2010/0165243 A1 * | 7/2010 | Yoon .................... G02B 6/0053 349/62 |
| 2011/0228558 A1 | 9/2011 | Uchida et al. |

FOREIGN PATENT DOCUMENTS

| CN | 101349397 A | 1/2009 |
| CN | 101910921 A | 12/2010 |
| TW | 583458 B | 4/2004 |

* cited by examiner

*Primary Examiner* — Evan P Dzierzynski

(57) ABSTRACT

A light source module includes a light guide plate, a light source, a first prism sheet and a reflection sheet. The light guide plate includes a light exit surface, a bottom surface opposite to the light exit surface, and a light entrance surface connected to the light exit surface and the bottom surface. The light source is disposed beside the light entrance surface and adapted to emit a light beam to the light entrance surface. The first prism sheet is disposed on the light exit surface and includes first prism units. A surface of the first prism units faces away from the light exit surface. The reflection sheet is disposed on the bottom surface. The light guide plate is located between the reflection sheet and the first prism sheet. The reflection sheet includes microstructures. A surface of the microstructures faces the bottom surface of the light guide plate.

10 Claims, 7 Drawing Sheets

LIGHT SOURCE MODULE

CROSS-REFERENCE TO RELATED APPLICATION

This application claims the priority benefit of Chinese application serial no. 201621135868.3 filed on Oct. 19, 2016. The entirety of the above-mentioned patent application is hereby incorporated by reference herein and made a part of this specification.

FIELD OF THE INVENTION

The invention relates to a light source module, and more particularly to a light source module including a reflection sheet having a plurality of microstructures.

BACKGROUND OF THE INVENTION

In a conventional display device, the backlight module generally includes a light source and a reflection sheet, a light guide plate, a lower diffusion sheet, a lower prism sheet, an upper prism sheet, an upper diffusion sheet (or brightness enhancement film) which are sequentially disposed upwardly. The light guide plate is an essential element in the backlight module for guiding a light beam to a display panel. Specifically, when the light beam emitted from the light sources enters into the light guide plate, the light beam is guided to transmit to another end of the light guide plate by the principle of total reflection; this time the light beam will only be transmitted in the light guide plate and cannot emit out from the light exit surface of the light guide plate. In order to guide the light beam to emit out from the light exit surface of the light guide plate, microstructures are disposed on the bottom surface of the light guide plate. When the light beam is transmitted to the bottom surface of the light guide plate and touches the microstructures, the light beam is reflected by the microstructures and diffused at various angles, thereby destroying the total reflection condition and interference to emit the light beam out from the light exit surface of the light guide plate.

However, after the light beam emitted from the light source enters into the light guide plate and emits out from the light guide plate, the light beam will be repeatedly reflected between the prism sheet and the reflection sheet. The larger the number of times of the light beam reflection between the prism sheet and the reflective sheet is, the more serious the energy attenuation of the light beam is, which may lead to the overall decline in illumination. Specifically, when the light beam passes through the bottom surface of the light guide plate, the reflection light beam reflected by the reflection sheet is transmitted back to the light guide plate and emitted to the lower prism sheet through the light exit surface of the light guide plate. If the angle of the reflection light beam cannot match with the light-exiting angle of the lower prism sheet, then the reflection light beam will be reflected back to the light guide plate, and repeatedly, the light energy consumption will increase. Generally, in order to improve the illumination, in addition to disposing the microstructures with different density or different shapes on the light guide plate, the number of light sources or the current of the light source may be increased, however, the effect of the improvement is limited and the cost also increases. Therefore, how to reduce the number of times of reflection of light beam between the prism sheet and the reflection sheet to improve the above-mentioned problem and to effectively guide the light beam to emit out from the prism sheet is a focus of attention of those skilled in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

Therefore, one objective of the invention is to provide a light source module having a structure design with an effect of increased illumination and adjustable viewing angle.

Other objectives and advantages of the invention can be further illustrated by the technical features broadly embodied and described as follows.

In order to achieve at least one or a portion of or all of the objects or other objects, one embodiment of the invention provides a light source module including a light guide plate, a light source, a first prism sheet and a reflection sheet. The light guide plate includes a light exit surface, a bottom surface opposite to the light exit surface, and a light entrance surface connected to the light exit surface and the bottom surface. The light source is disposed beside the light entrance surface of the light guide plate. The light source is adapted to emit a light beam to the light entrance surface. The first prism sheet is disposed on the light exit surface of the light guide plate and includes a plurality of first prism units. A surface of the first prism units faces away from the light exit surface. The reflection sheet is disposed on the bottom surface of the light guide plate. The light guide plate is located between the reflection sheet and the first prism sheet. The reflection sheet includes a plurality of microstructures. A surface of the microstructures faces the bottom surface of the light guide plate.

In summary, the light source module of the embodiment of the invention has at least one of the following advantages: utilizing the reflection sheet having a plurality of microstructures to reflect the light beam emitted out from the bottom surface of the light guide plate, adjusting the reflection angle of the light beam, and guiding the reflection light beam to enter into the light guide plate and emit out from the light exit surface of the light guide plate to the first prism sheet; because the reflection light beam is adjusted to have a specific reflection angle by the plurality of microstructures of the reflection sheet, the major portion of the reflection light beam may pass through the first prism sheet successfully and is used by the first prism sheet so as not to be reflected by the first prism sheet, thereby reducing the number of reflections of the light beam between the first prism sheet and the reflection sheet, increasing the light extraction amount and the illumination of the light source module, and further adjusting the vertical viewing angle of the light source module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
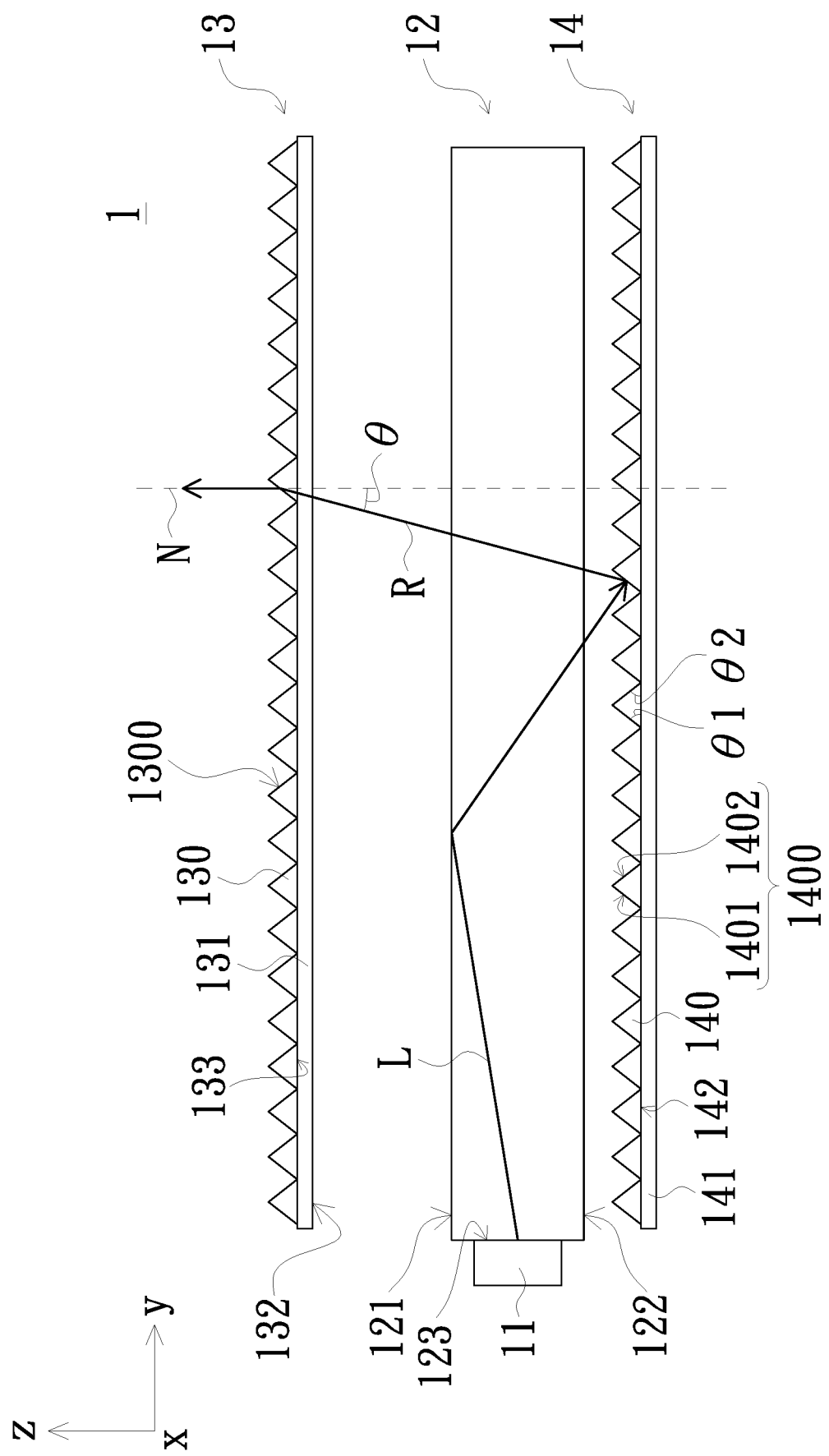
FIG. 1 is a schematic side view of a light source module in accordance with an embodiment of the invention.
Figure 2:
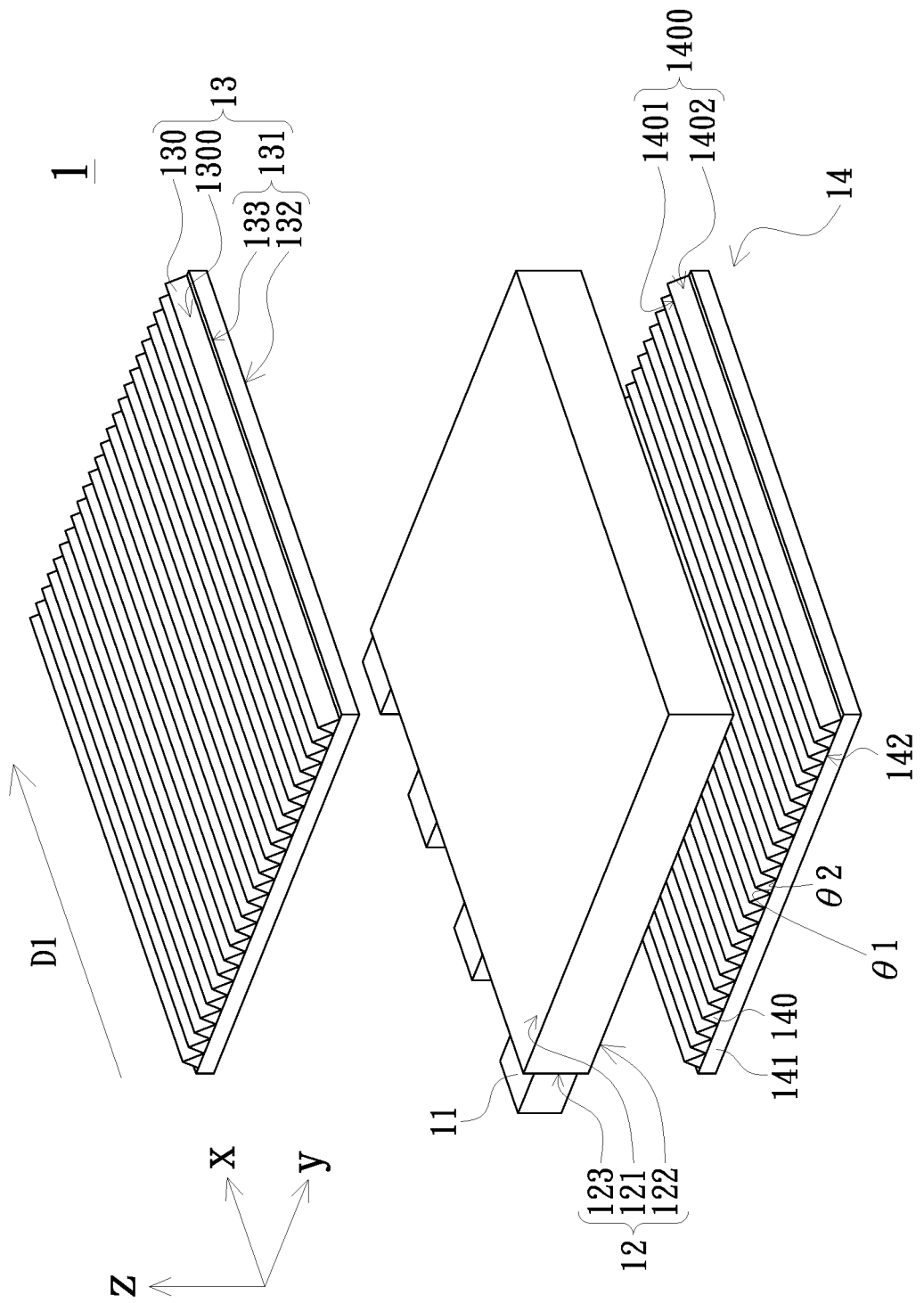
FIG. 2 is a schematic perspective structural view of the light source module shown in FIG. 1.

FIG. 1 is a schematic side view of a light source module in accordance with an embodiment of the invention. FIG. 2 is a schematic perspective structural view of the light source module shown in FIG. 1. As shown in FIGS. 1 and 2, the light source module 1 of the embodiment includes a light source 11, a light guide plate 12, a first prism sheet 13 and a reflection sheet 14. The light guide plate 12 includes a light exit surface 121, a bottom surface 122 opposite to the light exit surface 121, and a light entrance surface 123 connected to the light exit surface 121 and the bottom surface 122. In the embodiment, the light guide plate 12 has, for example, a flat-plate configuration. In other embodiments, the light guide plate 12 has, for example, a wedge shape. However, the configuration of the light guide plate 12 is not limited in the invention. The light source 11 is disposed beside the light entrance surface 123 of the light guide plate 12, and the light source 11 is adapted to emit a light beam L to the light entrance surface 123 of the light guide plate 12. The light source 11 is, for example, a light emitting diode (LED), and a plurality of light sources 11 are arranged and disposed in the x direction on the light entrance surface 123 of the light guide plate 12; however, the invention is not limited thereto. The first prism sheet 13 is disposed on the light exit surface 121 of the light guide plate 12, and the first prism sheet 13 includes a plurality of first prism units 130. A surface 1300 of the first prism units 130 faces away from the light exit surface 121 of the light guide plate 12. The reflection sheet 14 is disposed on the bottom surface 122 of the light guide plate 12. The light guide plate 12 is located between the reflection sheet 14 and the first prism sheet 13. The reflection sheet 14 includes a plurality of microstructures 140, and a surface 1400 of the microstructures 140 faces the bottom surface 122 of the light guide plate 12.

The structure of the embodiment of the light source module 1 will be described in detail below. In order to facilitate the description of the directions of the elements and structures in the light source module 1, a rectangular coordinate system is defined which includes a x-axis, a y-axis and a z-axis mutually orthogonal to each other; wherein the x-z plane is, for example, parallel with the light entrance surface 123, and the x-y plane is, for example, parallel with the light exit surface 121.

As shown in FIG. 1, the reflection sheet 14 of the embodiment further includes a substrate 141. The substrate 141 has a top surface 142 facing the bottom surface 122 of the light guide plate 12. The microstructures 140 of the reflection sheet 14 are connected to the top surface 142 of the substrate 141. The surface 1400 of each microstructure 140 includes a first slope surface 1401 adjacent to the light source 11 and a second slope surface 1402 far away the light source 11. The first slope surface 1401 adjoins the second slope surface 1402. A first included angle θ1 is between the first slope surface 1401 and the top surface 142 of the substrate 141. A second included angle θ2 is between the second slope surface 1402 and the top surface 142 of the substrate 141. In the embodiment, the first included angle θ1 between the first slope surface 1401 and the top surface 142 of the substrate 141 is, for example, greater than or equal to 16 degrees and smaller than or equal to 55 degrees, but the invention is not limited thereto. Specifically, the first slope surface 1401, the second slope surface 1402 and the top surface 142 of the substrate 141 constitute a symmetrical or asymmetrical triangle. Under a design that the first included angle θ1 is greater than or equal to 16 degrees and smaller than or equal to 55 degrees, the shape constituted by the first slope surface 1401, the second slope surface 1402 and the top surface 142 of the substrate 141 is, for example, an isosceles triangle or a right-angled triangle.

As shown in FIG. 2, the first prism units 130 of the first prism sheet 13 of the embodiment have a first extending direction D1 (i.e., the x direction), and the first extending direction D1 of the first prism units 130 is parallel with the light entrance surface 123 of the light guide plate 12. In addition, the first prism sheet 13 further includes a first substrate 131. The first substrate 131 has a first surface 132 and a second surface 133 opposite to the first surface 132. In the embodiment, the first surface 132 of the first substrate 131 is opposite to the light exit surface 121 of the light guide plate 12 and facing the light exit surface 121. The first prism units 130 are arranged and disposed in the y direction on the second surface 133 of the first substrate 131. Specifically, the first prism units 130 are connected to the second surface 133 of the first substrate 131.

As shown in FIG. 1, when the light beam L emitted from the light source 11 enters into the light guide plate 12 via the light entrance surface 123 of the light guide plate 12, a portion of the light beam L passes through the bottom surface 122 of the light guide plate 12 and is transmitted to the reflection sheet 14 through the microstructures (not shown in figure, the configuration of the microstructures is not limited in the invention) on the bottom surface 122 of the light guide plate 12 to destroy the total reflection. At this time, the surface 1400 of the microstructures 140 of the reflection sheet 14 reflects the portion of the light beam L to form a reflection light beam R transmitted in a direction toward the light guide plate 12. In the embodiment, the microstructures 140 reflect the portion of the light beam L passing through the bottom surface 122 of the light guide plate 12 with, for example, the first slope surface 1401 as the light receiving surface. Because the first included angle θ1 between the first slope surface 1401 and the top surface 142 of the substrate 141 is greater than or equal to 16 degrees and smaller than or equal to 55 degrees, the light beam L may be further adjusted to the reflection light beam R with a specific light-exiting angle. The reflection light beam R with a specific light-exiting angle is sequentially emitted out from the light exit surface 121 of the light guide plate 12, transmitted to the first prism sheet 13, passes through the first prism sheet 13 and is used by the first prism sheet 13 without being reflected by the first prism units 130 of the first prism sheet 13, thereby effectively improving the light extraction efficiency of the light beam L emitted out from the first prism sheet 13. As a result, the light energy attenuation caused by the repeated light reflections between the prism sheet and the reflection sheet in prior art is improved and accordingly the luminance is increased. Specifically, an included angle θ is between the above reflection light beam R with a specific light-exiting angle and a normal line N of the light exit surface 121 of the light guide plate 12, and the included angle θ is, for example, greater than or equal to 30 degrees and smaller than or equal to 60 degrees, but the invention is not limited thereto. Further, when the reflection light beam R passing through the first prism sheet 13, the reflection light beam R is adjusted by the first prism units 130 of the first prism sheet 13 as an exiting light beam in a forward direction (i.e., the z direction). The above forward exiting light beam (i.e., the reflection light beam R) overlaps with the normal line N of the light exit surface 121 of the light guide plate 12. By utilizing the reflection sheet 14 having the microstructures 140 to adjust the angle of the reflection light beam R, the light extraction amount of the light source module 1 is effectively increased, the illumination of the light source module 1 is increased consequentially, and also the vertical viewing angle (the viewing angle in the y direction) of the light source module 1 is adjusted to be deviated toward the center (i.e., the center of the light exit surface 121).

In the embodiment, it is to be noted that the first included angle θ1 between the first slope surface 1401 of the reflection sheet 14 and the top surface 142 of the substrate 141 is designed to be greater than or equal to 16 degrees and smaller than or equal to 55 degrees due to that the vertical viewing angle of the light source module 1 may not be located close to the center and the luminance gain effect of the light source module 1 is not ideal when the first included angle θ1 is smaller than 16 degrees and the vertical viewing angle of the light source module 1 is significantly deviated from the center and the luminance gain effect of the light source module 1 is greatly reduced when the first included angle θ1 is greater than 55 degrees.

Figure 3:
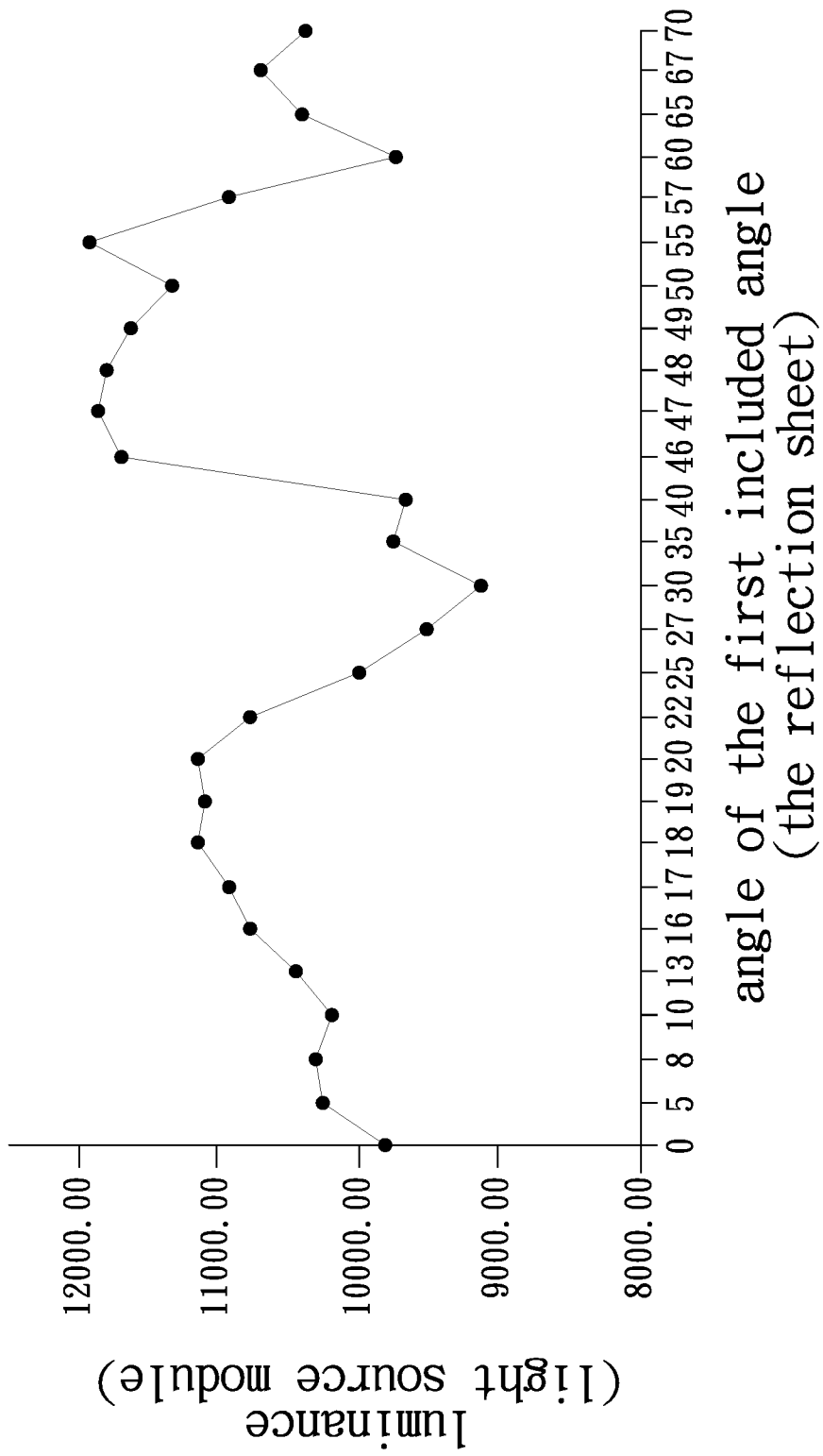
FIG. 3 is a diagram showing the relationship of the first included angle between the first slope surface and the top surface of the substrate shown in FIG. 1 and the luminance.

It is to be noted that the embodiment of designing the first included angle θ1 between the first slope surface 1401 of the reflection sheet 14 and the top surface 142 of the substrate 141 to be greater than or equal to 16 degrees and smaller than or equal to 55 degrees is only one embodiment of the invention. In another embodiments, the first included angle θ1 between the first slope surface 1401 of the reflection sheet 14 and the top surface 142 of the substrate 141 may be designed to be greater than or equal to 16 degrees and smaller than or equal to 25 degrees or designed to be greater than or equal to 45 degrees and smaller than or equal to 55 degrees. Please refer to FIG. 3, which is a diagram showing the relationship of the first included angle θ1 between the first slope surface 1401 of the reflection sheet 14 and the top surface 142 of the substrate 141 shown in FIG. 1 and the luminance; wherein the horizontal axis represents the angle (unit: degree) of the first included angle θ1, and the vertical axis represents the luminance (unit: $cd/m^2$). As shown in FIG. 3, the luminance of the light source module 1 may be up to about 11000 $cd/m^2$ when the first included angle θ1 is greater than or equal to 16 degrees and smaller than or equal to 25 degrees, and the luminance of the light source module 1 may be up to about 12000 $cd/m^2$ when the first included angle θ1 is greater than or equal to 45 degrees and smaller than or equal to 55 degrees. Therefore, by the above design of the first included angle θ1, the vertical viewing angle of the light source module 1 is located close to the center and a preferable luminance gain effect is obtained.

It is to be noted that the above embodiment does not limit the angular range of the second included angle θ2. However, in other embodiments, the first included angle θ1 and the second included angle θ2 may be designed to be greater than or equal to 16 degrees and smaller than or equal to 55 degrees at the same time. In addition, the first slope surface 1401 and the second slope surface 1402 of each microstructure 140 of the above embodiment are, for example, planes inclined with respect to the top surface 142 of the substrate 141. However, in other embodiments, the first slope surface 1401 and the second slope surface 1402 of each microstructure 140 are, for example, cambered surfaces with a circular arc protruding outwardly or inwardly. The configurations of the first slope surface 1401 and the second slope surface 1402 are not limited in the invention, and may be varied depending on the actual needs.

Figure 4:
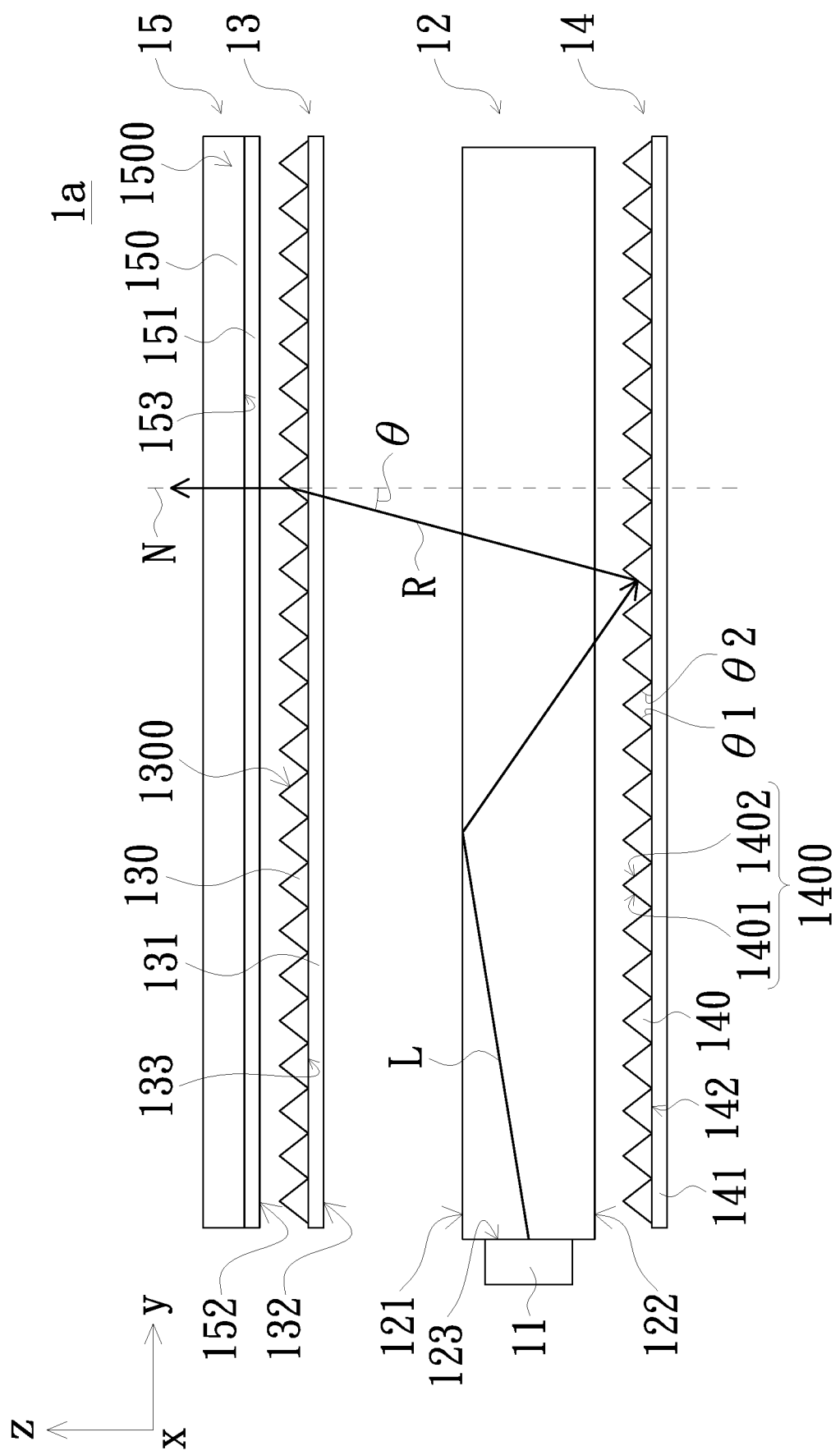
FIG. 4 is a schematic side view of a light source module in accordance with another embodiment of the invention.
Figure 5:
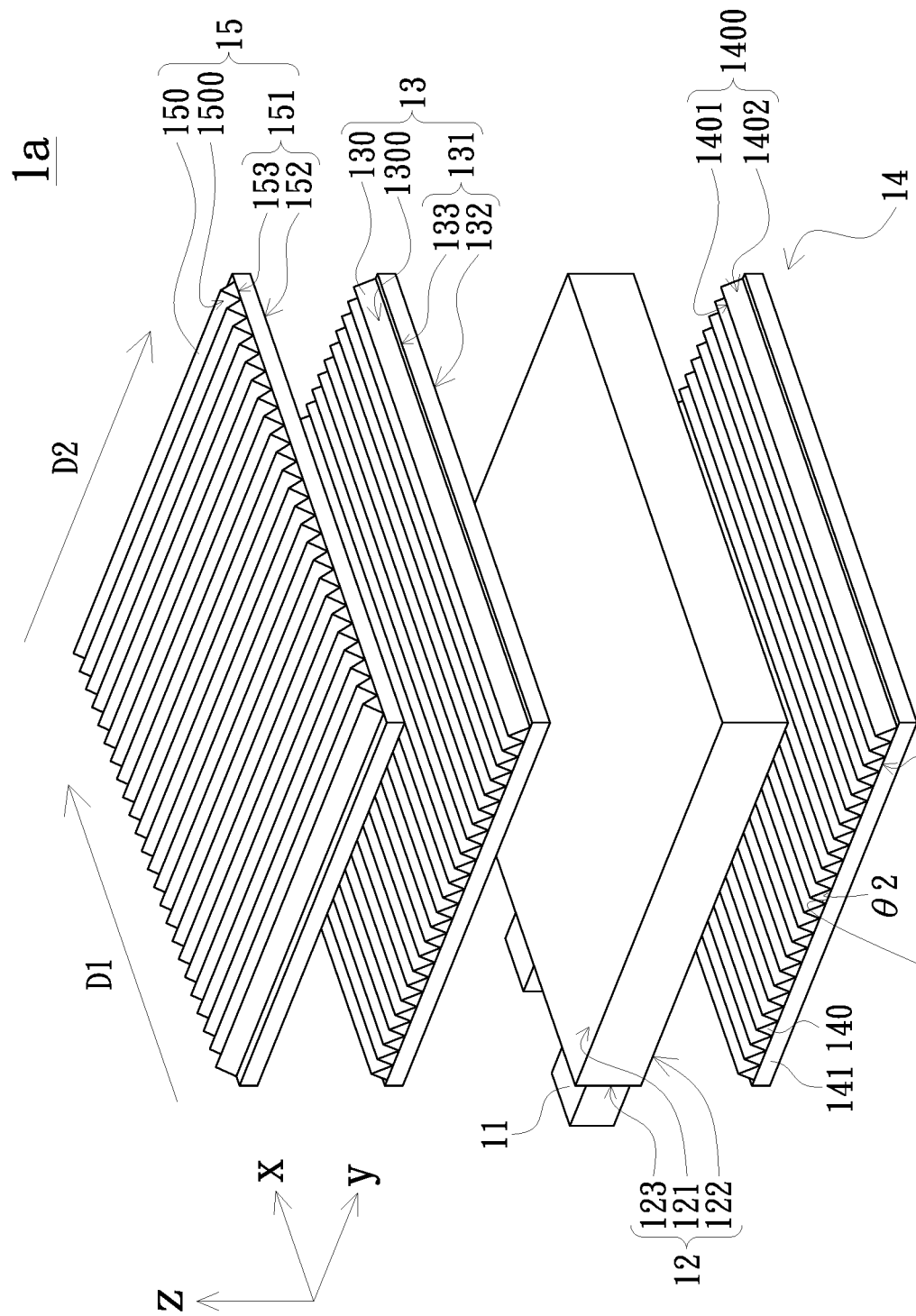
FIG. 5 is a schematic perspective view of the light source module shown in FIG. 4.

FIG. 4 is a schematic side view of a light source module in accordance with another embodiment of the invention. FIG. 5 is a schematic perspective view of the light source module shown in FIG. 4. As shown in FIGS. 4 and 5, the light source module 1a of the embodiment is similar to the light source module 1 shown in FIGS. 1 and 2 except that the light source module 1a of the embodiment further includes a second prism sheet 15. The first prism sheet 13 is located between the second prism sheet 15 and the light exit surface 121 of the light guide plate 12, and the second prism sheet 15 includes a plurality of second prism units 150. A surface 1500 of the second prism units 150 faces away from the light exit surface 121 of the light guide plate 12, in other words, the surface 1500 of the second prism units 150 of the second prism sheet 15 and the surface 1300 of the first prism units 130 of the first prism sheet 13 face the same direction. The second prism units 150 have a second extending direction D2 (i.e., the y direction), and the second extending direction D2 of the second prism units 150 is perpendicular to the first extending direction D1 of the first prism units 130. In other words, the second extending direction D2 of the second prism units 150 is perpendicular to the light entrance surface 123 of the light guide plate 12. In addition, the second prism sheet 15 further includes a second substrate 151. The second substrate 151 has a third surface 152 and a fourth surface 153 opposite to the third surface 152. In the embodiment, the third surface 152 of the second substrate 151 is opposite to second surface 133 of the first substrate 131 and facing the second surface 133. The second prism units 150 are arranged and disposed in the x direction on the fourth surface 153 of the second substrate 151. Specifically, the second prism units 150 are connected to the fourth surface 153 of the second substrate 151. Under the architecture of the light source module 1 shown in FIGS. 1 and 2, the light source module 1a of the embodiment is additionally disposed with the second prism sheet 15 to corporate with the first prism sheet 13, thereby further enhancing the luminance gain effect of the light source module 1a. In other embodiments, the second prism sheet 15 may be disposed between the first prism sheet 13 and the light exit surface 121 of the light guide plate 12 to achieve the same effect as described above.

Figure 6A:
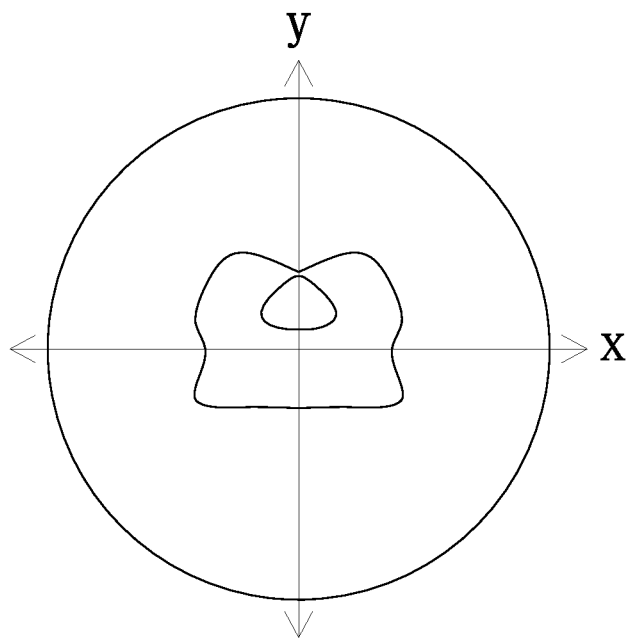
FIG. 6A is a schematic illustration of the viewing angle of a conventional light source module.
Figure 6B:
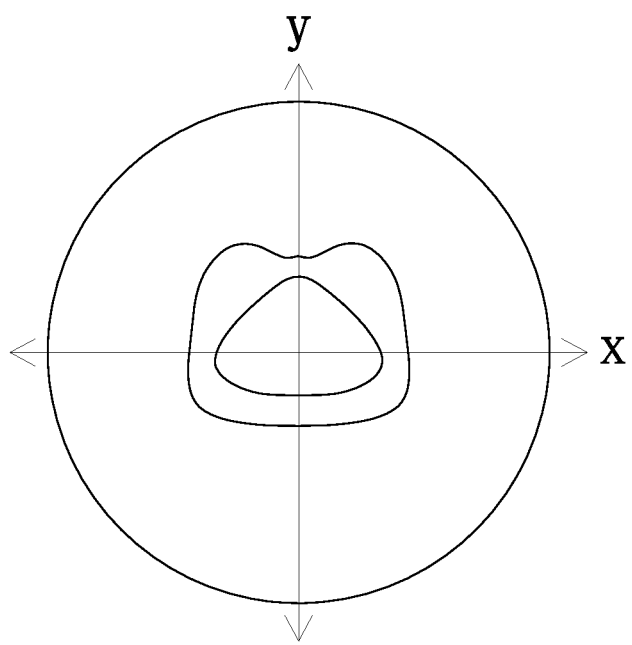
FIG. 6B is a schematic illustration of the viewing angle of the light source module of the embodiment of the invention.

FIG. 6A is a schematic illustration of the viewing angle of a conventional light source module. FIG. 6B is a schematic illustration of the viewing angle of the light source module of the embodiment of the invention. According to the viewing angle shown in FIG. 6A, it is known that the vertical viewing angle (i.e., the viewing angle in the y direction) of the conventional light source module is relatively deviated from the center, that is, closer to the y direction (upwardly) and farther from the crossing point of the x direction and the y direction. Therefore, in order to view the light beam of the conventional light source module, the user needs to adjust his/her position to be deviated from the center of the light exit surface. According to the viewing angle shown in FIG. 6B, it is known that the light source modules 1 and 1a of the embodiment of the invention utilize the reflection sheet 14 having a plurality of microstructures 140 to adjust the reflection angle of the light beam and then adjust the vertical viewing angle (i.e., the viewing angle in the y direction) of the light source modules 1 and 1a to be deviated closer to the center (the crossing point of the x direction and the y direction, i.e., the center of the light exit surface 121), so that the user can see the light beam of the light source module at the center of the light exit surface.

Figure 7:
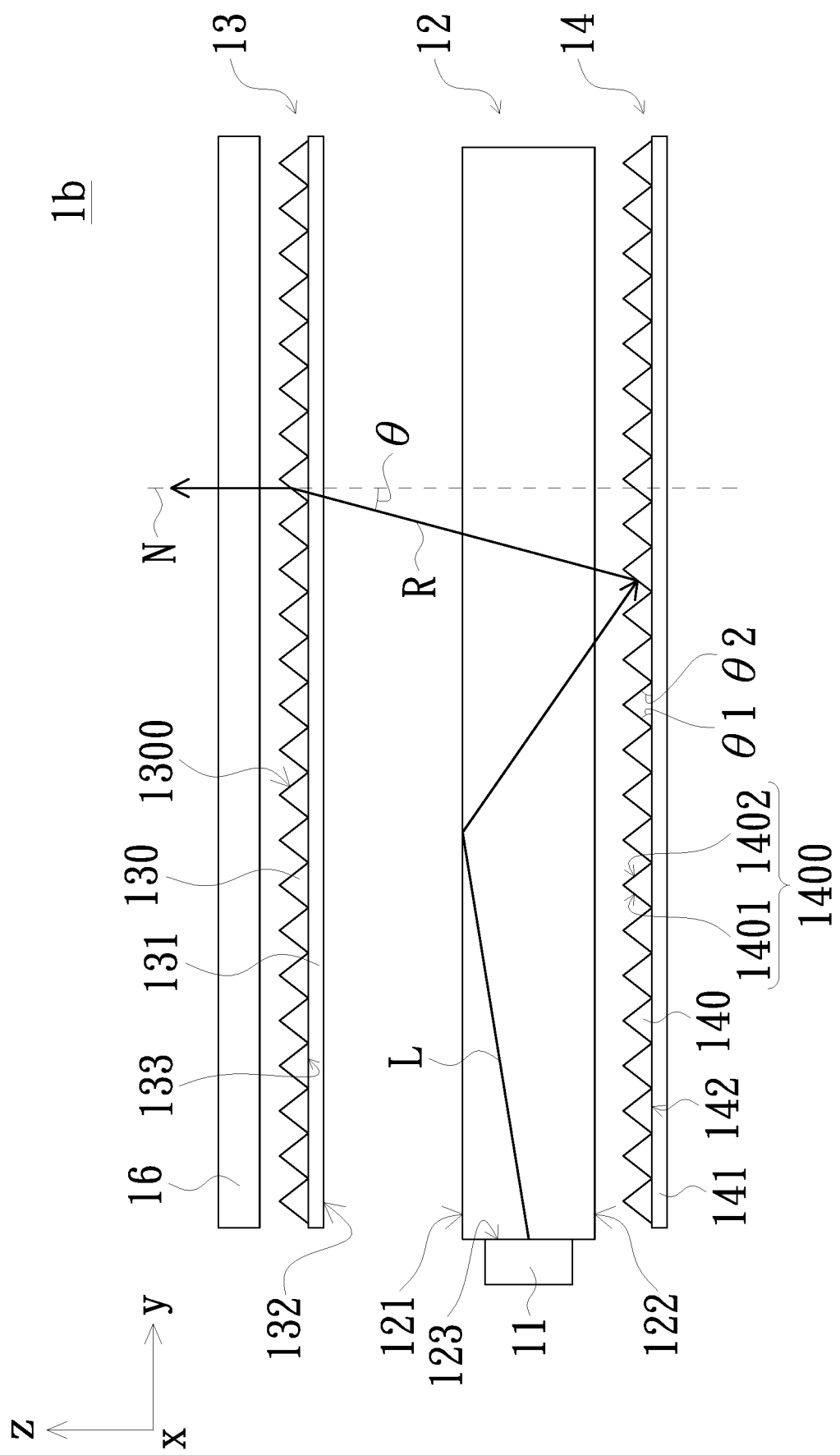
FIG. 7 is a schematic side view of a light source module in accordance with another embodiment of the invention.

Please refer to FIG. 7, which is a schematic side view of a light source module in accordance with another embodiment of the invention. The light source module 1b of the embodiment is similar to the light source module 1 shown in FIGS. 1 and 2 except that the light source module 1b of the embodiment further includes a diffusion sheet 16. The first prism sheet 13 is located between the diffusion sheet 16 and the light exit surface 121 of the light guide plate 12, and the surface 1300 of the first prism units 130 of the first prism sheet 13 faces the diffusion sheet 16. Under the architecture of the light source module 1 shown in FIGS. 1 and 2, the light source module 1b of the embodiment is additionally disposed with the s diffusion sheet 16, thereby further enhancing the luminance gain effect of the light source module 1b. However, the diffusion sheet 16 is not essential in the invention and is selective depending on the actual situation. Further, the diffusion sheet 16 of the embodiment may be selectively additionally disposed in the architecture of the light source module 1a shown in FIGS. 4 and 5. Further, compared with the conventional backlight module, the above embodiments of the invention may omit at least the lower diffusion sheet located between the lower prism sheet and the light exit surface of the light guide plate, therefore, the cost may be reduced and the compact effect is also achieved.

In summary, the light source module of the embodiment of the invention has at least one of the following advantages: utilizing the reflection sheet having a plurality of microstructures to reflect the light beam emitted out from the bottom surface of the light guide plate, adjusting the reflection angle of the light beam, and guiding the reflection light beam to enter into the light guide plate and emit out from the light exit surface of the light guide plate to the first prism sheet; because the reflection light beam is adjusted to have a specific reflection angle by the plurality of microstructures of the reflection sheet, the major portion of the reflection light beam may pass through the first prism sheet successfully and is used by the first prism sheet so as not to be reflected by the first prism sheet, thereby reducing the number of reflections of the light beam between the first prism sheet and the reflection sheet, increasing the light extraction amount and the illumination of the light source module, and further adjusting the vertical viewing angle of the light source module. In addition, the effects of cost reduction and size and weight reduction are also achieved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A light source module, comprising:
   a light guide plate, comprising a light exit surface, a bottom surface opposite to the light exit surface, and a light entrance surface connected to the light exit surface and the bottom surface;
   a light source, disposed beside the light entrance surface of the light guide plate, wherein the light source is adapted to emit a light beam to the light entrance surface;
   a first prism sheet, disposed on the light exit surface of the light guide plate and comprising a plurality of first prism units, wherein a surface of the first prism units faces away from the light exit surface; and
   a reflection sheet, disposed on the bottom surface of the light guide plate, wherein the light guide plate is located between the reflection sheet and the first prism sheet, the reflection sheet comprises a plurality of microstructures, and a surface of the microstructures faces the bottom surface of the light guide plate;
   wherein the reflection sheet further comprises a substrate, the substrate has a top surface facing the bottom surface, the microstructures are connected to the top surface, the surface of each one of the microstructures comprises a first slope surface adjacent to the light source and a second slope surface far away the light source, the first slope surface adjoins the second slope surface, a first included angle is between the first slope surface and the top surface, an angle of the first included angle is θ1, and 45 degrees≤θ1≤55 degrees;
   wherein the microstructures of the reflection sheet are adapted to reflect a portion of the light beam passing through the bottom surface to form a reflection light beam transmitted toward the light guide plate, the reflection light beam is emitted out from the light exit surface, an included angle is between the reflection light beam and a normal line of the light exit surface, an angle of the included angle is θ, and 30 degrees≤θ≤60 degrees.

2. The light source module according to claim 1, wherein a second included angle is between the second slope surface and the top surface.

3. The light source module according to claim 2, wherein an angle of the second included angle is θ2, and 16 degrees≤θ2≤55 degrees.

4. The light source module according to claim 1, wherein the first prism units of the first prism sheet have a first extending direction, and the first extending direction is parallel with the light entrance surface of the light guide plate.

5. The light source module according to claim 1, further comprising a second prism sheet, wherein the first prism sheet is located between the second prism sheet and the light exit surface of the light guide plate, the second prism sheet comprises a plurality of second prism units, and a surface of the second prism units faces away from the light exit surface.

6. The light source module according to claim 5, wherein the first prism units have a first extending direction, the second prism units have a second extending direction, the first extending direction is parallel with the light entrance surface of the light guide plate, and the second extending direction is perpendicular to the first extending direction.

7. The light source module according to claim 5, wherein the first prism sheet further comprises a first substrate, the first substrate has a first surface and a second surface opposite to the first surface, the first surface is opposite to the light exit surface of the light guide plate, and the first prism units are disposed on the second surface.

8. The light source module according to claim 7, wherein the second prism sheet further comprises a second substrate, the second substrate has a third surface and a fourth surface opposite to the third surface, the third surface is opposite to the second surface of the first substrate, and the second prism units are disposed on the fourth surface.

9. The light source module according to claim 1, further comprising a diffusion sheet, wherein the first prism sheet is located between the diffusion sheet and the light guide plate, and the surface of the first prism units of the first prism sheet faces the diffusion sheet.

10. The light source module according to claim 1, wherein the reflection light beam passing through the first prism sheet overlaps the normal line of the light exit surface.

* * * * *